C. NELSON.
VEHICLE.
APPLICATION FILED AUG. 25, 1909.
1,003,644.
Patented Sept. 19, 1911.
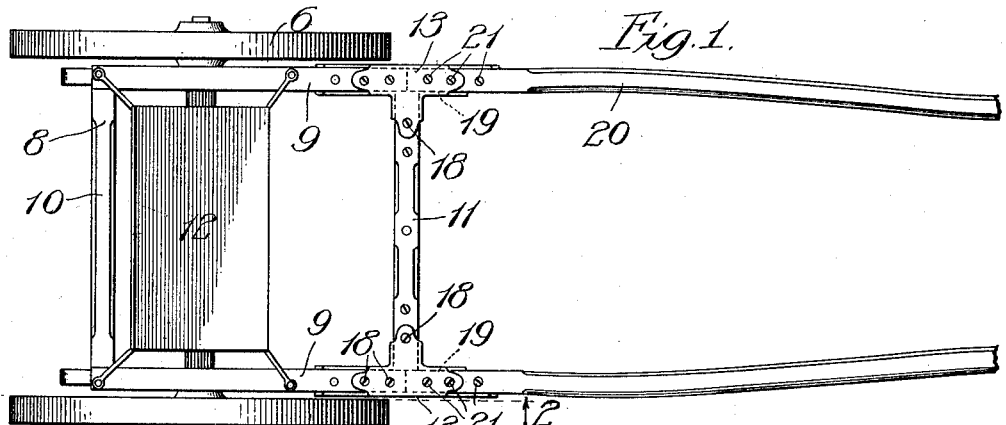
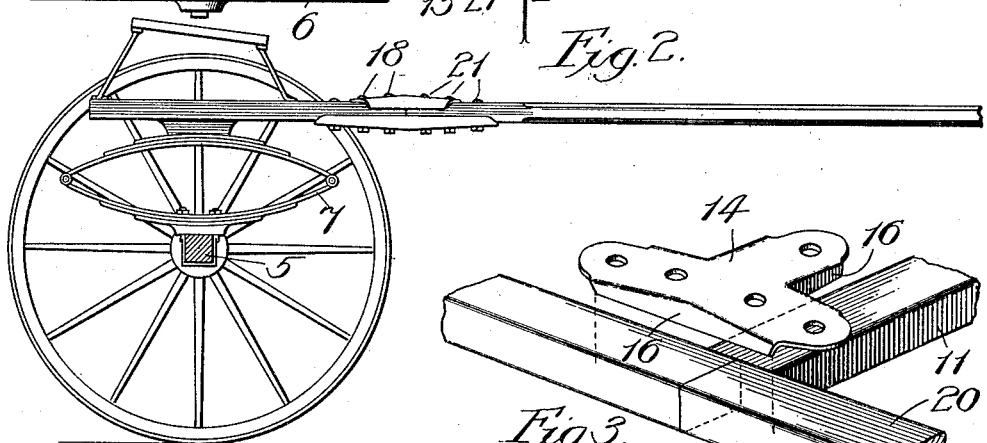
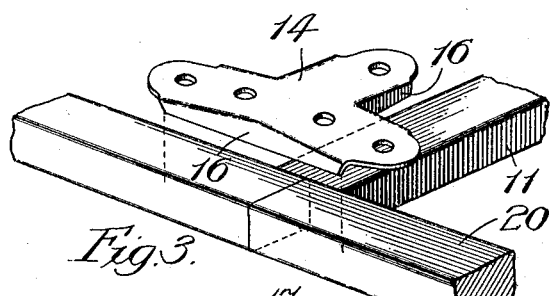
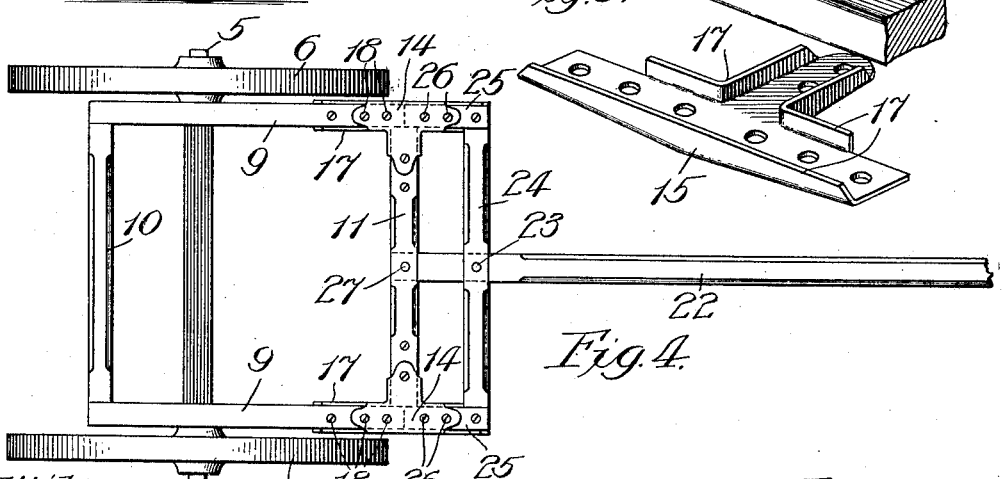
Witnesses:
Inventor:
Christian Nelson,
By Dyrenforth, Lee, Chritton & Wiles
Attys.

UNITED STATES PATENT OFFICE.

CHRISTIAN NELSON, OF MORRISON, ILLINOIS.

VEHICLE.

1,003,644. Specification of Letters Patent. Patented Sept. 19, 1911.

Application filed August 25, 1909. Serial No. 514,511.

*To all whom it may concern:*

Be it known that I, CHRISTIAN NELSON, a citizen of the United States, residing at Morrison, in the county of Whiteside and State of Illinois, have invented a new and useful Improvement in Vehicles, of which the following is a specification.

My invention relates, more particularly to improvement in means for securing the shafts or pole-shaft to the frame of a vehicle and has special application to vehicles known as breaking-carts in which the shaft or shafts are required to be of relatively great lengths to so position the horse relative to the cart as to prevent the horse from kicking the cross-bar of the vehicle; and my primary object is to provide a construction of coupling means, the parts of which shall be interchangeable, which will insure the desired rigidity to the vehicle structure, and permit of the interchangeable use of single and double shafts.

Referring to the drawings—Figure 1 is a plan view of a breaking-cart shown as provided with a pair of shafts and embodying my invention, the coupling means therefor being shown exaggerated in size. Fig. 2 is a section taken at the line 2 on Fig. 1, and viewed in the direction of the arrow. Fig. 3 is an enlarged perspective view of a portion of the vehicle-frame and the end of the adjacent shaft, together with a coupling member therefor, this view being diagrammatic in nature and showing the parts in related but disassembled condition; and Fig. 4, a plan view of the cart illustrated in Fig. 1 showing the cart as equipped with a single pole for use when it is desired to draw the vehicle by a pair of horses.

The breaking-cart in connection with which I have chosen to illustrate my invention comprises an axle 5 equipped with wheels 6 and supporting a pair of elliptical springs 7 surmounted by a frame 8 composed of side-members 9, 9, a rear member 10, and a front cross-piece 11, the frame thus provided supporting a seat 12. In the preferred embodiment of my invention illustrated, the means through the medium of which the shafts or pole-piece are connected with the frame 8, also serves to hold the frame together at its forward ends, these coupling means being represented at 13 and each formed of an upper and a lower member 14 and 15, respectively. Each of the members 14 and 15, which are preferably malleable castings, but may be stamped from sheet metal, are of general T-shape in plan and U-shaped in cross-section to afford channels flanked by flanges 16 and 17, respectively. Each corner of the frame is provided with a pair of members 14 and 15 which fit against the upper and under sides of the forward extremities of the frame-sides 9 and the opposite ends of the cross-bar 11 and confine these parts of the frame between them in the channels afforded by the flanges 16 and 17, bolts 18 passing through the members 14 and 15, the forward ends of the frame-sides 9 and the opposite ends of the cross-piece 11 for rigidly fastening these frame-members together. I prefer to so position the cross-bar 11 as to cause the side-pieces 9 to overlap the ends of this cross-piece a distance equal to one-half of the width of the latter, and to construct the members 15 of greater length than the members 14 as represented, and, furthermore, provide the portions of the coupling members which extend beyond those portions which engage with the cross-piece 11, of the same length, whereby these coupling members may be made with the greatest economy in the use of material and are rendered interchangeable and thus applicable to either end of the cross-piece and frame-sides 9. The coupling members 14 and 15 thus provided project beyond the cross-piece 11 and afford sockets 19 which are adapted to receive the ends of a pair of shafts, such as those represented at 20 in Fig. 1, which may be secured in these sockets as by bolts 21 passing through the shafts and the coupling members. The forward extensions of the coupling members 14 and 15 are also adapted to afford a means for connection of a single pole-frame to the frame 8, as for instance that illustrated in Fig. 4, shown as formed of a single centrally disposed pole 22 connected between its ends, as by a bolt 23, to a cross-bar 24, the outer ends of the latter carrying rearwardly-projecting extensions 25 which fit into the sockets 19 and are rigidly held therein by bolts 26, the rear end of the pole-piece 22 being connected with the center of the cross-bar 11 as by a bolt 27.

It will be understood that the shafts 20 and pole 22 are interchangeable, the socket-members carried by the frame 8 permitting of the substitution of one for the other with comparative ease and without sacrifice to rigidity of structure.

The inner flanges 17 on the members 15 are preferably of less length than the outer flanges are represented, to permit of the insertion of the extensions 25 into the sockets 19 the required distance.

Coupling means constructed in accordance with my invention not only serve to permit of the substitution of the one form of shaft for the other, and the rigid securing thereof to the frame 8, but also permit of the interchanging of its members 14 and 15 in the sense that neither need be made especially for one corner of the vehicle-frame. In other words, the coupling members need not be made in what are known as rights and lefts.

While I have illustrated and described my invention as applied to a breaking-cart, I do not wish to be understood as limiting my invention to its embodiment in a vehicle of this character, as it presents utility when embodied in vehicles of other types. Furthermore, it is not limited to constructions in which interchangeability of the shaft is contemplated, as certain of its features may be incorporated in a vehicle employing either of the forms of shafts illustrated.

What I claim as new, and desire to secure by Letters Patent, is—

In a vehicle, the combination of a frame formed with side-members and a front cross-member, said side-members extending short of the forward edge of said cross-member and overlapping the ends of the latter a distance equal approximately to one-half the width of said cross-member, upper and lower flanged plates embracing the outer extremities of said cross-member and the forward ends of said frame-members and affording outwardly opening sockets beyond said frame-sides, said sockets being free of obstruction, means for securing together said side-members, cross-member and plates, shaft-sections extending at their rear ends into said sockets and overlapping portions only of the ends of said cross-member and removable and insertible into said sockets without disturbing said securing means, and means for releasably securing said shaft sections to said plates independently of the means securing the latter to the ends of the cross-member and said side-members.

CHRISTIAN NELSON.

In presence of—
Jos. JOHANSON,
F. O. RHYNEER.

---

Copies of this patent may be obtained for five cents each, by addressing the "Commissioner of Patents, Washington, D. C."